United States Patent [19]
Chouly et al.

[11] Patent Number: 5,504,775
[45] Date of Patent: Apr. 2, 1996

[54] MULTI-USER SPREAD SPECTRUM COMMUNICATION SYSTEM

[75] Inventors: Antoine Chouly, Paris; Américo Brajal, Villeneuve Le Roi; Sabine Jourdan, Savigny Sur Orge, all of France

[73] Assignee: U.S. Philips Corporation, New York, N.Y.

[21] Appl. No.: 190,397

[22] Filed: Feb. 2, 1994

[30] Foreign Application Priority Data

Feb. 3, 1993 [FR] France ................................ 93 01182

[51] Int. Cl.$^6$ ...................................................... H04K 1/10
[52] U.S. Cl. ............................ 375/205; 375/295; 370/18; 370/19
[58] Field of Search ............................... 375/1, 59, 205; 380/34; 370/18, 19, 21, 23

[56] References Cited

U.S. PATENT DOCUMENTS

| | | | |
|---|---|---|---|
| 4,494,228 | 1/1985 | Gutleber | 370/18 |
| 5,204,874 | 4/1993 | Falconer et al. | 375/1 |
| 5,311,550 | 5/1994 | Fouche et al. | 370/19 X |
| 5,327,455 | 7/1994 | De Gaudenzi et al. | 375/1 |
| 5,329,552 | 7/1994 | de Couasnon et al. | 375/59 |
| 5,345,440 | 9/1994 | Gledhill et al. | 370/19 |
| 5,371,761 | 12/1994 | Daffara et al. | 375/1 |

FOREIGN PATENT DOCUMENTS 0446024  9/1991  European Pat. Off. .

OTHER PUBLICATIONS

"Single Carrier vs. Orthogonal Multicarrier Techniques Applied to Direct Sequence Spread Spectrum CDMA Systems" Laboratoires D'Electronique Philips S. Jourdan et al, Dec. 4, 1992.
"Digital Communications" J. G. Proakis, Chapter 8, pp. 800–817.

Primary Examiner—David C. Cain
Attorney, Agent, or Firm—David L. Schreiber

[57] ABSTRACT

Multi-user communication system which combines means that implement the spread spectrum coding technique SSC with means that implement the modulation technique of orthogonal frequency-division multiplexing OFDM. This makes it possible to inhance the performance of the SSC system by simplifying certain data processing and data acquisition mechanisms.

A preferred use is the use in telephone communication systems between mobile stations and base stations.

11 Claims, 7 Drawing Sheets

MULTI-USER SPREAD SPECTRUM COMMUNICATION SYSTEM

BACKGROUND OF THE INVENTION

The invention relates to a multi-user communication system comprising at least a base transceiver station and a plurality of user transceiver stations communicating with one other over transmission channels via the base station, the system comprising:

- transforming means for transforming transmit messages into symbols of a constellation at the transmitter end and means for performing reverse options in each user station at the receiver end,
- coding means for coding said symbols with a code by spread spectrum coding at the transmitter end and decoding means for performing reverse operations at the reveiver end,
- means for transmitting/receiving coded data over a channel.

The invention likewise relates to a user transceiver station, more specifically, either a mobile station ensuring communication by radio links, or a fixed station communicating by cables, satellites or otherwise. The invention likewise relates to a base station intended and relay messages with the object of putting mobile stations into communication with one another.

A communication system among users is to satisfy several criteria and among these criteria the criterion of confidentiality is easily satisfied. The designers of such systems are thus oriented at the use of codes for the transmission of transmit messages. A high-performance coding system is the Code Division Multiple Access CDMA system. This system presents advantages of confidentiality, robustness to disturbance, robustness to interference or degradation and can furthermore be easily dimensioned to any number of users. The principle of the CDMA system consists of spreading the frequency spectrum. Therefore, a message to be coded, formed by bits of elementary length Ts, is multiplied before transmission by a pseudo-random bit sequence having an elementary length Tc, so that Tc=Ts/L. The parameter L is the period of the sequence, that is to say, the number of bits of the sequence. Each utilizer has thus his own allocated sequence. A base station receives the coded messages coming from all the users, decodes them and then recodes them and relays them to all the users. The base station generates the communications, that is to say, it enables a user and that user alone to decode a message intended for him. Such a system makes the use of an equalizer necessary when receiving, which equalizer may become complex with a rising number of users. In effect, when echoes from a multipath environment occur, the echoes relating to a user's channel will generally not be the same as the echoes from another user's channel. The real performance of such a system is thus limited. On the other hand, it is necessary to synchronize the receiver with the beginning of each sequence, so that the received message can be decoded, which often forms a problem.

Such a system is described, for example, in the book by J. G. PROAKIS, "Digital Communications", chapter 8, pp. 800–817, published by McGraw-Hill Book Company (1989), New York.

SUMMARY OF THE INVENTION

It is an object of the invention to enhance the transmission reliability and capacity in the communications among users.

An additional object is to maintain reduced complexity in the system whilst its performance is enhanced.

These objects are achieved with the communication system defined in the opening paragraph, in which the transceiver means comprise multicarrier modulating and demodulating means by orthogonal frequency-division multiplexing.

Thus, advantageously an equalizer for equalizing the signals which have been subject to echoes caused by a multipath environment need no longer be used at the receiver end. In effect, when organizing the modulated signal in the form of successive frames which are constituted by blocks comprising check intervals, it is possible to absorb all the delays caused by multiple paths. Neither are there any problems of synchronization with the beginning of each coding sequence, because all the synchronization mechanisms are derived from those used by the orthogonal frequency-division multiplexing. The choice and the number of coding sequences is much greater. The transmitted energy is much better frequency-divided over the channel, which renders this system more robust to selective fading. Moreover, the secondary lobes have less energy, which renders the system less sensitive to interference from adjacent channels. The combination of the spread spectrum technique with the technique of multicarrier orthogonal frequency-division multiplexing (OFDM) thus brings novel performance and advantages.

A system according to the invention is formed by user transceiver stations which may be mobile, and at least a base station which is fixed. The base station covers what is referred to as a cell, that is to say, it has a certain operating range. Beyond this operating range there is another base station which takes over the relay when the mobile station has left the boundaries of the cell. Advantageously, due to the invention, one cell can have a larger size whereas, previously, the increase of the size required enhanced complexity of the equalizer.

Each user station comprises transmitter means for transmitting to the base station and means for decoding only the messages intended for that user station.

The base station comprises transmitter means for transmitting to all the user stations and receiver means for receiving messages sent by all the user stations and management means for managing the communications traffic among the user stations.

In a user station or a base station the modulating means comprise:
- input serial/parallel converter means for coded transmit symbols,
- means for simultaneously applying an inverse Fourier transform to the symbols to be transmitted on the plurality of carriers,
- means for adding protection symbols against echoes,
- parallel/serial converter means,
- means for forming frames of symbol blocks and for adding special symbol blocks.

The special symbols may be synchronization symbols, service symbols, channel estimation symbols or other symbols.

Similarly, the demodulating means comprise:
- a sampler
- input serial/parallel converter means for received modulated data,
- means for applying a direct Fourier transform to produce said received coded symbols, parallel/serial converter means.

The means for applying an inverse Fourier transform can be preceded by time-division/frequency-division symbol interleaving means. In that case the means for applying a direct Fourier transform are followed by time-division/frequency-division symbol de-interleaving means.

At the receiver end one or several automatic gain control module(s) may be added for taking signal attenuations into consideration. These modules may be disposed at the receiver end either downstream of the correlator(s) which applies (apply) the pseudo-random sequence(s) used for the coding at the transmitter end, or with each coded message assigned to each carder at the output of the means for applying the direct Fourier transform.

These different aspects of the invention and other aspects too will become apparent and be explained with respect to the embodiments to be described hereinafter.

BRIEF DESCRIPTION OF THE DRAWINGS

The invention will be better understood with the aid of the following Figures shown by way of non-limiting examples which represent in:

FIG. 4A: 2 coding diagram and FIG. 4B 2 decoding circuit diagram of the same known principle applied to the base station.

DETAILED DESCRIPTION OF THE PREFERRED EMBODIMENT

Figure 10:
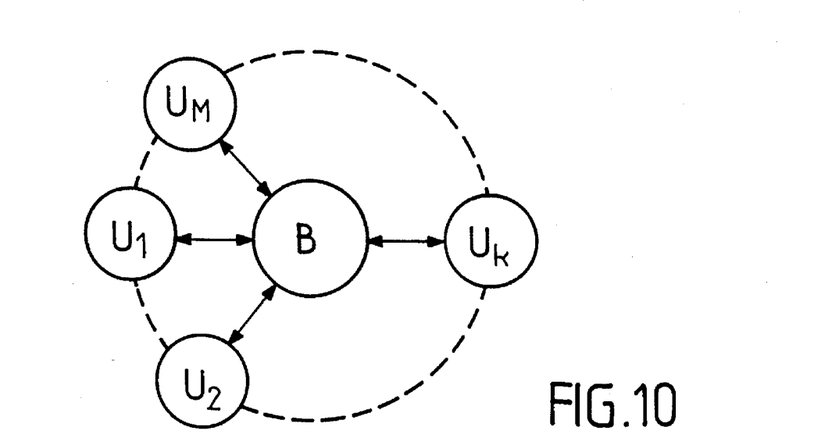
FIG. 10: a general circuit diagram of a multi-user communication system.

FIG. 10 symbolically shows a multi-user communication system ($U_1, U_2 \ldots U_k \ldots U_M$), where M is the total number of users. All the users communicate via two-way links with a base station B. This base station B serves as a relay to put two user stations into communication with each other. A base station has a coverage area. With the user stations being a priori mobile stations, a user station $U_2$ (or several of them) can leave the coverage area of a base station $B_1$. In this case another base station $B_2$ participates in the management of the communications. The two base stations $B_1$, $B_2$ then exchange management information signals to put a user station $U_1$ (of the coverage area of $B_1$) into contact with a user station $U_2$ (of the coverage area of $B_2$).

Figure 1:
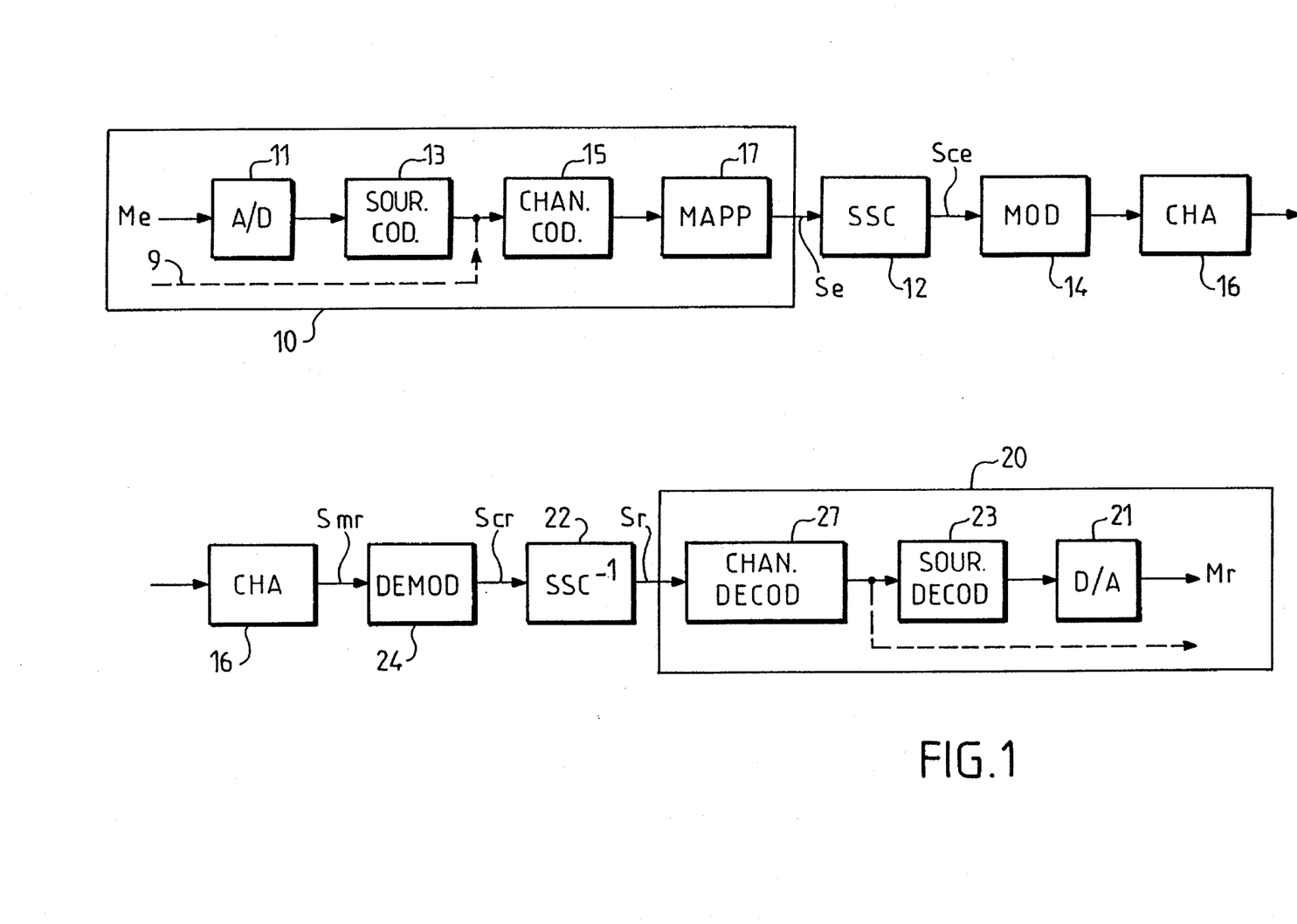
FIG. 1: a circuit diagram of a transceiver processing system functioning in a user station.

A conventional processing array used in an arbitrary user station is shown in FIG. 1. At the transmitter end it comprises in a series combination:

coding means 10 for coding transmit messages Me and transforming them into symbols Se of a constellation, spread spectrum coding means SSC 12 for coding the transmit symbols Se, and modulating means 14 which modulate a carrier with digital data in the baseband, which data represent the symbols. The transmission is then effected over channel CHA 16.

The means 10 for coding the message Me comprise in a series combination:

analog/digital converter means A/D which may be followed by a source coder SOUR. COD. 13, a channel coder CHAN. COD. 15, and an allocation element MAPP 17 for the digital data in a constellation.

This may relate to QAM, QPSK, BPSK or other constellations. The source coder 13 and the channel coder 15 cannot be used according to the characteristics of the communication channel. Similarly, the A/D converter 11 and the source coder 13 cannot be used if the message Me is available in digital form (link 9). Conversely, the converter is used, for example, in the case of spoken messages for telephone communications from mobile user stations.

A user station also comprises means for receiving data coming from other user stations via the base station. Therefore, it also comprises:

demodulating means 24 for extracting the baseband digital data which represent the received coded symbols Scr, decoding means $SSC^{-1}$ 22 for decoding received symbols Sr, said decoding means 22 performing the reverse operations to those performed by the coding means 12, decoding means 20 for decoding the received messages Mr in response to the received symbols Sr by performing the reverse operations to those performed at the transmitter end by the coding means 10.

The decoding means 20 comprise, in a series combination, channel decoding means CHAN DECOD 27, source decoding means SOUR. DECOD 23 and digital/analog converter means D/A 21. These means exist in the cases where the reverse coding operations have previously been performed at the transmitter end.

The invention basically relates to the modulating means 14 when digital data are transmitted which represent symbols Se and the demodulating means 24 for extracting received symbols Sr, whilst means 24 perform at the receiver end the reverse operations to those performed at the transmitter end.

Figure 2:
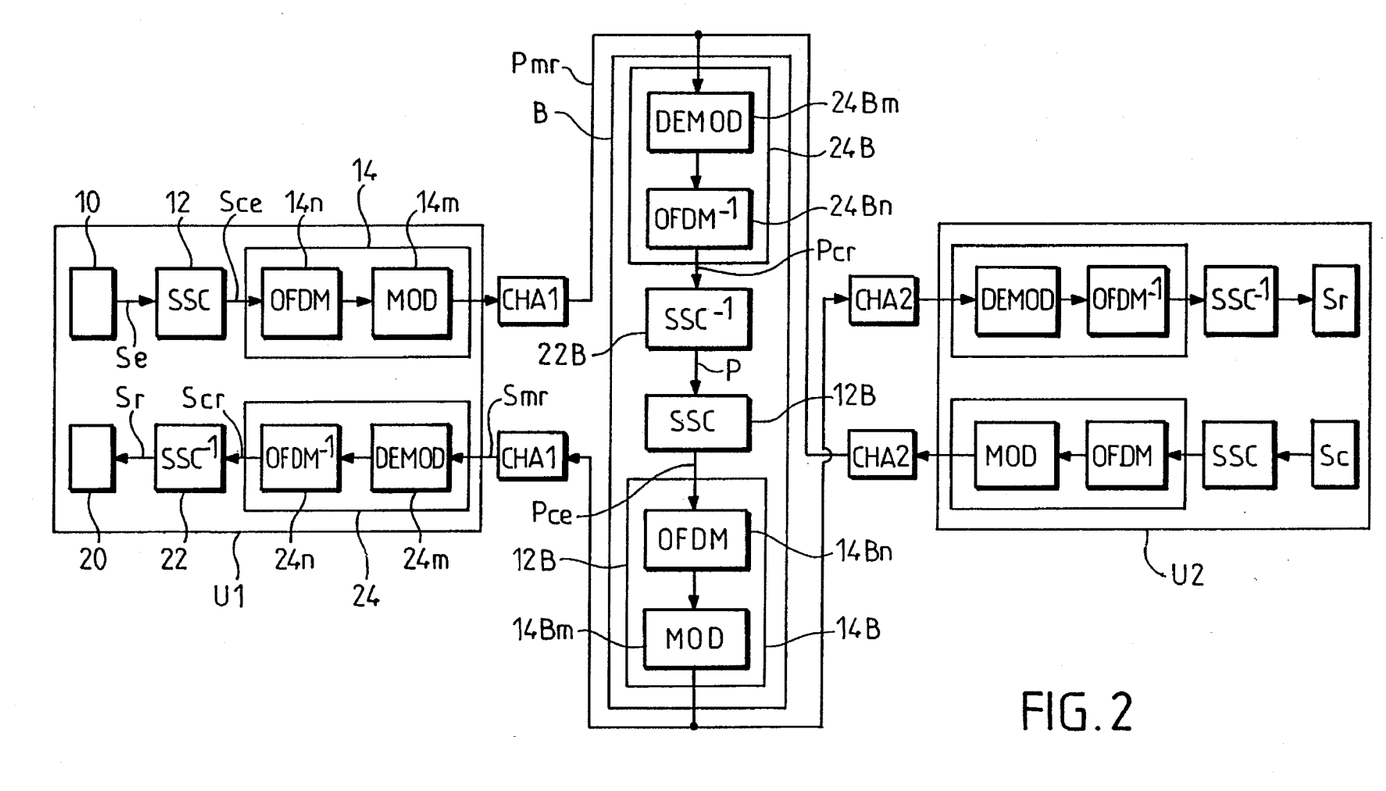
FIG. 2: a general circuit diagram of part of a communication system according to the invention.

FIG. 2 shows a circuit diagram of a communication system according to the invention, comprising a base station B and user stations, for example, two stations $U_1$ and $U_2$. Since the user stations have the same transceiver means, only station $U_1$ will be described in detail hereinafter, it being understood that a transmitting station communicates with another station then operating as a receiving station.

According to the invention a spread spectrum coding SSC is combined with a multicarrier orthogonal frequency-division multiplex OFDM modulation. At the receiver end the reverse operations are performed in a reverse order.

Station $U_1$ comprises coding means 10 which produce symbols Se. These are then coded in the spread spectrum coding device SSC 12 followed by a multiplexer OFDM 14n and a multicarrier modulator 14m, the digital data being transmitted as has previously been described.

These data which may be altered by the transmit channel CHA1 arrive at the base station B as data Pmr. They are demodulated in a demodulator DEMOD 24Bm, then demultiplexed by demultiplexing means OFDM$^{-1}$ 24Bn to produce the received coded symbols Pcr, then a decoding SSC$^{-1}$ 22B which is the reverse to that performed at the transmitter end, produces decoded symbols P. These symbols P are in their turn recoded at the base station by coding means SSC 12B and multiplexed by a multiplexer OFDM 14Bn, then relayed via a multicarrier modulator 14Bm. The transmit symbols arrive through a channel CHA2 which may be different from the preceding channel, at another user station $U_2$ which acts as a receiving station. Let us consider the case where the station $U_1$ operates as the receiving station of another transmitting station. This receiving station receives modulated symbols Star which are demodulated by the demodulator DEMOD 24m and then demultiplexed by a demultiplexer OFDM$^{-1}$ 24n which produces received coded symbols Scr, which symbols are then decoded by decoding means SSC$^{-1}$ 22 which decoding means perform a reverse decoding of the SSC coding performed at the transmitter end.

The base station B receives all the data coming from all the user stations. These data arrive superimposed on those in the same frequency band at the input of the base station. This base station manages the communications. For this purpose, when a station $U_1$ is to be put into contact with a station $U_2$, the base station B recodes the transmit message either with the sequence of the user station for which the message is intended, or with the same sequence as that of the transmitting station, and the base station sends to the receiving station the sequence belonging to the transmitting station, so that the receiving station can decode the messages arriving there through the channel.

Figure 3A:
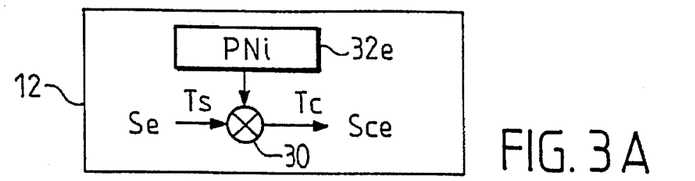
FIG. 3A: a circuit diagram (A) of known principle for spread spectrum coding and FIG. 3b an associated decoding circuit diagram operating in a user station.
Figure 3B:
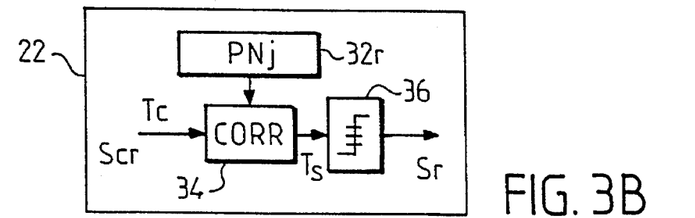
Figure 4A:
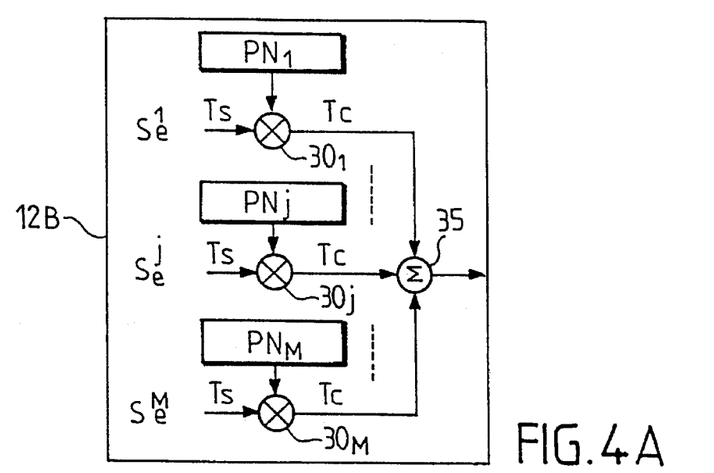
Figure 4B:
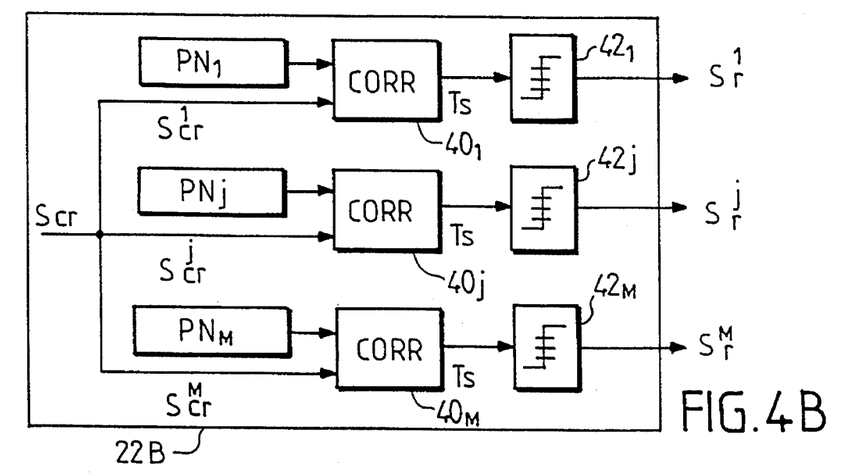

FIGS. 3 and 4 describe the known spread spectrum coding/decoding technique implemented by the invention.

FIG. 3 represents a circuit diagram (A) of the principle of the spread spectrum coding SSC used for messages coming from a single source. For this purpose, a digital symbol Se of the constellation in the baseband and having time period Ts is multiplied at the transmitter end in a multiplier 30 by a pseudo-random sequence PNi coming from a periodic sequence generator 32e. The sequence may be invariable for each user station. In this case the sequence generator may be a memory which permanently stores the sequence PNi. The sequence PNi is formed by a bit sequence of binary period Tc, where Ts=L.Tc. The parameter L forms the period of the sequence. L coded symbols Sce at the output of the multiplier 30 correspond to each symbol Se. This is translated in the frequency domain by a wider band, thus a spread spectrum. In the conventional techniques the coded symbol Sce is then transmitted as indicated in FIG. 1. At the receiver end, still in the baseband, the received coded symbol Scr is fed (FIG. 3-B) to a correlator 34 which receives from a generator 32r either pseudo-random sequence PNi, identical with that used by the transmitting station which sends the symbol, or its own sequence PNj if the base station has thus re-coded the symbols. The output of the correlator generally ends in a decision circuit 36 which produces the uncoded received symbol Sr which is an estimate of the transmitted symbol Se. If the decoding is not a decision decoding, the decision element 36 is not used. The estimate is then made in the processing stages that follow.

FIG. 3 represents the mechanisms used in arbitrary user stations. FIG. 4 represents the mechanisms used in a base station which communicates with these user stations.

A base station comprises both a transmitting and a receiving section. Elements of the transmitting section are diagrammatically shown in FIG. 4-A. Various digital symbols $S_e^1 \ldots S_e^j \ldots S_e^M$ are to be transmitted. Each of these symbols is multiplied in the multiplier $30_1 \ldots 30_j \ldots 30_M$ respectively, by the pseudo-random sequence $PN_1 \ldots PN_j \ldots PN_M$ respectively, belonging to each user station. All the outputs are regrouped in a summator 35 to be transmitted via the modulator through the channel (FIG. 1). The receiving section is represented diagrammatically in FIG. 4-B. All the messages arrive at the base station and are combined to a symbol sequence to be decoded Scr. These symbols enter a set of correlators $40_1 \ldots 40_j \ldots 40_M$ which receive the pseudo-random sequences $PN_1 \ldots PN_j \ldots PN_M$ respectively, which are identical with those used at the transmitter end. As described above, the outputs of the correlators generally enter the decision elements $42_1 \ldots 42_j \ldots 42_M$ respectively, which produce each an estimate $S_r^1 \ldots S_r^j \ldots$ Shd r$^M$ ... of the transmitted symbols. The base station may work in two different ways: when it receives a signal coded with a sequence $PN_i$ intended for a user station using a sequence $PN_j$, the base station can either recode the received message with the sequence $PN_j$ used by the receiving station of the message, or recode the received message with the sequence $PN_i$ and transmit to the receiving station the sequence that is to be used for decoding.

FIGS. 3 and 4 describe the known technique of spread spectrum coding. According to the invention this coding is followed at the transmitter end by an additional multicarrier modulation stage via orthogonal frequency-division multiplexing, and at the receiver end a stage is included performing reverse operations.

Figure 5:
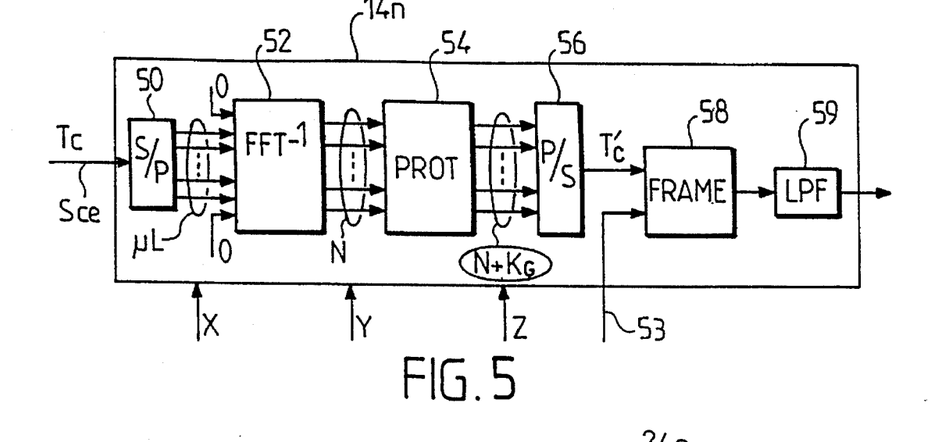
FIG. 5: a circuit diagram of an OFDM multiplexer intended to be used with a multicarrier transmission.

FIG. 5 is an example of a basic circuit diagram of an OFDM multiplexer 14n. The digital data representing the coded transmit symbols Sce, coming from the coder SSC 12, undergo a serial/parallel conversion in a block 50. The parallel data enter an $N^{th}$ order inverse Fourier transform computation element FFT$^{-1}$ 52 which produces N parallel output signals.

At a given instant the N parallel output signals form part of an OFDM dam block. A device 54 adds data corresponding to a check interval to this data block part. This consists of copying certain data.

Figure 11:
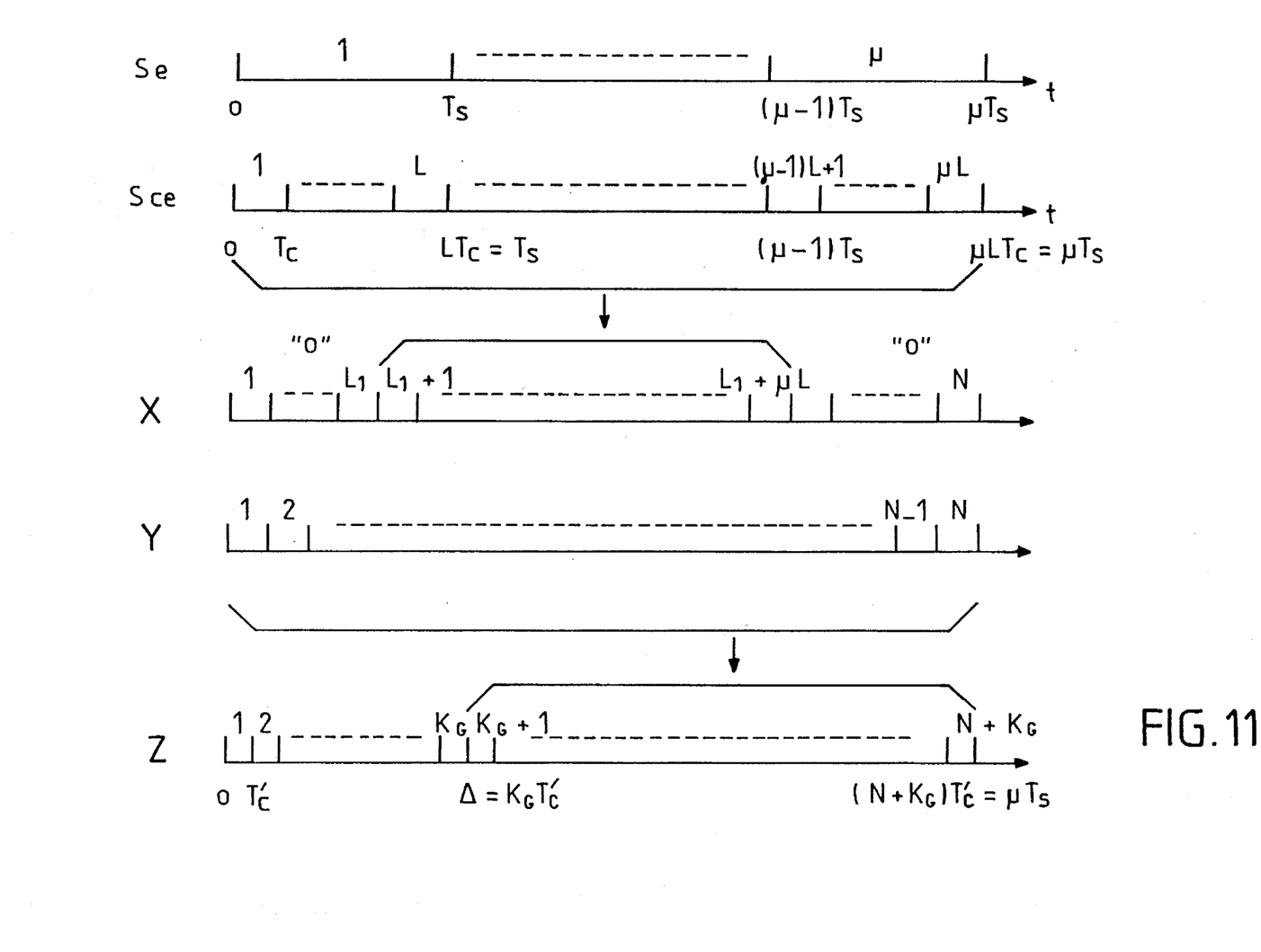
FIG. 11: a symbol distribution diagram covering a period of time µTs.

FIG. 11 gives a detailed representation of the mechanisms used for the construction of an OFDM data block. A symbol Se has a complex value in general. The first curve represents a state sequence of a symbol Se to be coded. A symbol Se has a time period Ts. A sequence having various symbols, for example μ symbols, is considered to correspond to a period of time μ.Ts.

After these symbols Se have passed through the coder SSC 12 (FIG. 2), they become the coded symbols Sce. A symbol Se thus becomes L symbols Sce. For the period of time μTs one thus has μL symbols Sce.

Block 50 (FIG. 5) performs a serial/parallel conversion and produces in parallel the μL symbols which enter block 52 that performs an $N^{th}$ order inverse Fourier transform, so that N=$2^k$>μL, where k is an integer. Therefore, the μL symbols are completed by a number of L1=(N−μL)/2 "0" data on either side of the input of block 52 (referenced X). If N−μL is odd, the beginning or end of the block obtains an additional symbol. To allow N symbols to leave afterwards during an interval μTs, block 52 functions with a shorter period, which is μ.Ts/N (referenced Y). The N symbols leaving block 52 are in their turn completed by $K_G$ symbols, which corresponds to a check interval $\Delta=K_G.T'c$ that forms a protection. The $K_G$ symbols correspond to a copy of the last of the N preceding symbols. These $K_G$ symbols are affixed to the N symbols to form a data block of ($K_G$+N) symbols to be transmitted (referenced Z). There too the check block 54 works with a still shorter period of time (T'c=μtTs/(N+$K_G$)), so that at a later stage, a serial output signal of ($K_G$+N) symbols is possible for a duration which is kept equal to μTs. A parallel/serial converter 56 converts the ($K_G$+N) symbols to the serial mode. The successive blocks of ($K_G$+N) OFDM symbols are then organized in an OFDM frame in a device 58 referenced FRAME. This device 58 adds special symbols 53 (synchronization, wobbling or other symbols) which are used, for example, for synchronizing the transmitter with the receiver or for estimating the channel. A low-pass filter LPF 59 filters the signals before they are transmitted by the multicarrier modulator 14m, 14Bm (FIG. 2).

Figure 6:
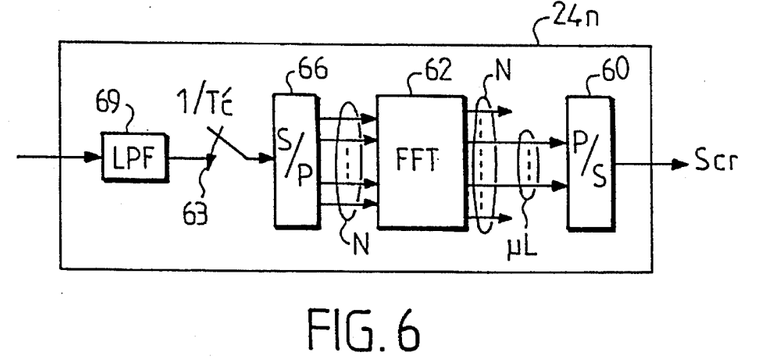
FIG. 6: a circuit diagram of an OFDM demultiplexer.

At the receiver end the received modulated symbols Smr are demodulated by the demodulator 24m (FIG. 2) and then enter the device OFDM$^{-1}$ 24n, which carries out a reverse process to that carried out at the transmitter end. The device 24n comprises in a series combination (FIG. 6):

a low-pass filter 69 a sampler 63 with a timing 1/T'c, a serial/parallel converter 66 which produces N useful signals and which thus discards the $K_G$ symbols received during the check interval, a calculation element 62 for a direct Fourier transform which produces a sequence of N symbol blocks.

a parallel/serial converter 60 which processes these μL symbols and produces the received coded symbols Scr. These symbols Scr enter the decoder SSC$^{-1}$ 22, 22B described before (FIG. 3, FIG. 4-B).

The ends of the N-symbol blocks are waived to save only the central part which comprises μL symbols.

Figure 12:
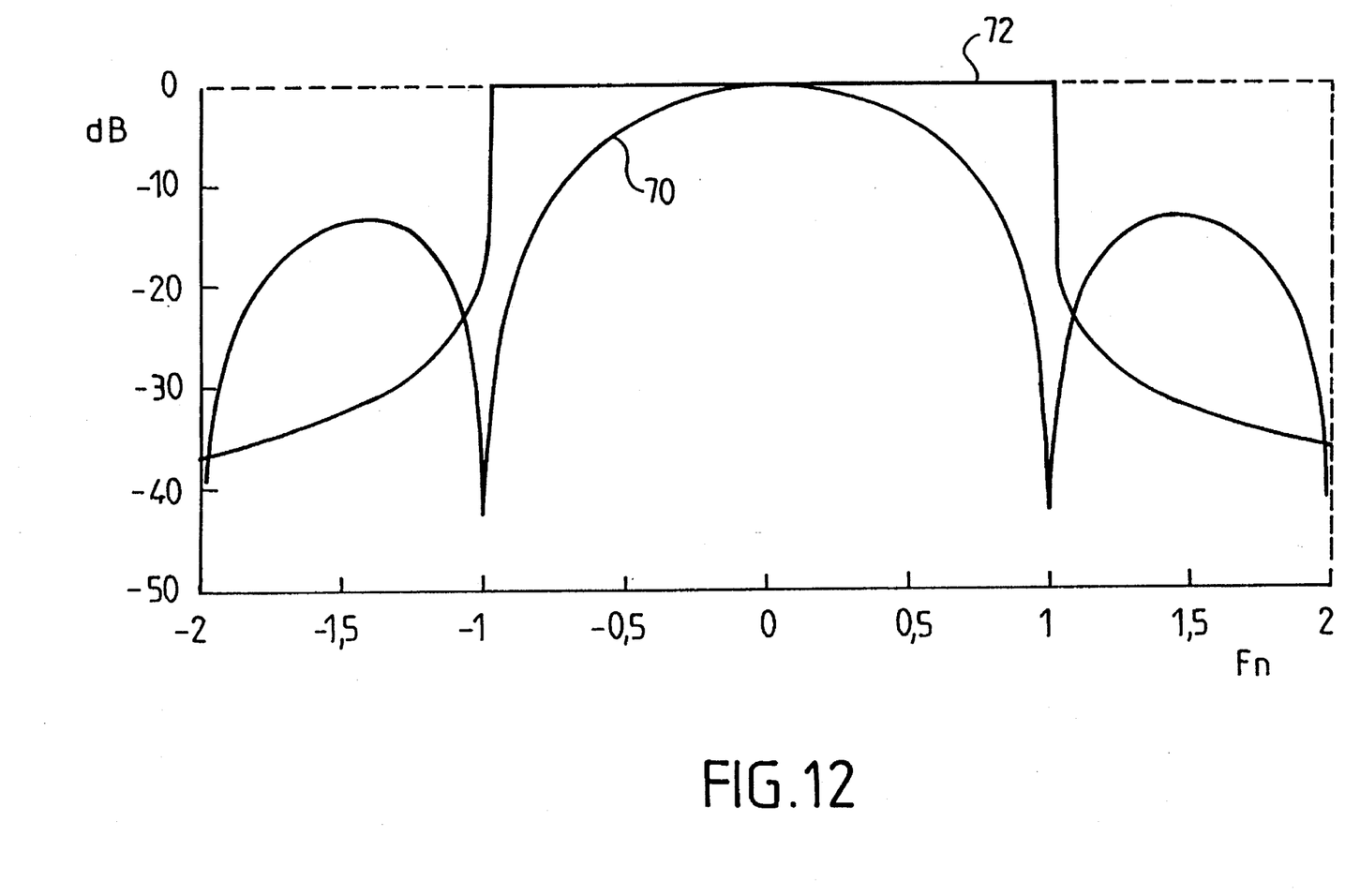
FIG. 12: two curves of the frequency response of a conventional spread spectrum system and of a system according to the invention.

FIG. 12 shows the spectral power density of the transmitted signal plotted against frequency. Curve 70 corresponds to a conventional spread spectrum system, and curve 72 corresponds to a system according to the invention, which combines the spread spectrum techniques with the orthogonal frequency-division multiplexing techniques for transmission by multicarriers. The horizontal scale corresponds to a baseband frequency $F_n$ normalized relative to the useful band of the signal. The vertical scale corresponds to the spectral density expressed in dB. It is noted that for a monocarrier system the spectrum 70 presents maximum energy in the centre, but that the energy decreases very rapidly in the useful band. In contrast, for a multicarrier system, the spectrum 72 is rectangular, which shows that the energy transmitted for all the carriers remains constant in the useful band of the signal. There is thus a better use of the transmit channel which renders the transmissions more reliable and reduces the complexity of the receiving circuits. It is noted that the energy outside the useful band is much smaller for a multicarrier system than for a monocamer system.

If the channel can be subject to multipath interference, it is desirable to interleave symbols at the transmitter end and de-interleave symbols at the receiver end.

Figure 7A:
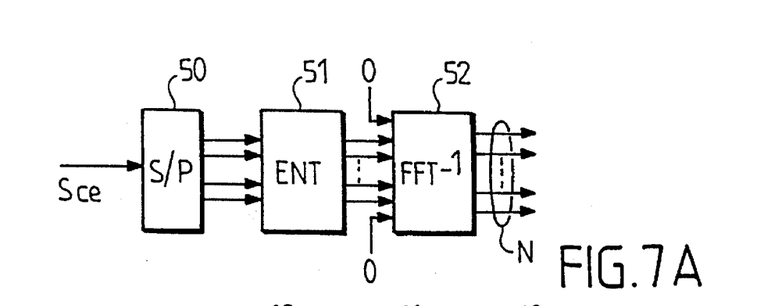
FIG. 7A: 2 circuit diagram with interleaving of the symbols at the transmitter end and FIG. 7B with de-interleaving of the symbols at the receiver end.

The circuit diagram shown in FIG. 7-A is a modified version of FIG. 5. Between the device S/P 50 and the device FFT$^{-1}$ 52 is inserted an interleaver ENT 51 which interleaves the symbols in accordance with known techniques.

Figure 7B:
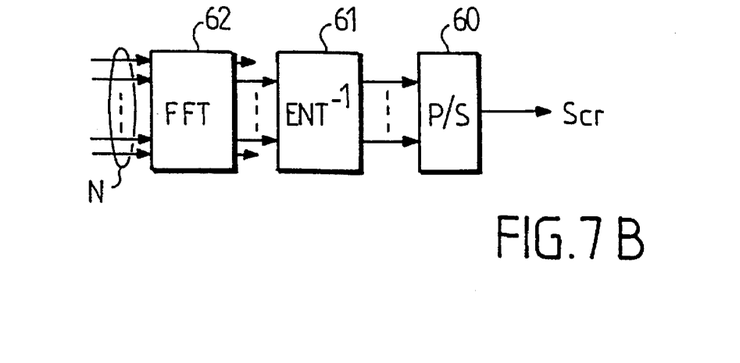

Reciprocally, the circuit diagram shown in FIG. 7-B is a modified version of FIG. 6. Between the device FFT 62 and the device P/S 60 is inserted a de-interleaver ENT$^{-1}$ 61 which performs the reverse operations to those performed at the transmitter end.

The interleaving/de-interleaving operations are not desired, for example, in the case of direct satellite links.

The circuit diagrams of the OFDM multiplexers shown in FIGS. 5 and/or 7-A are used for realising the OFDM multiplexer 14n of a user station and for realising the OFDM multiplexer 14Bn of a base station.

Similarly, the circuit diagrams of the demultiplexers represented in FIGS. 6 and/or 7-B are used for realising the demultiplexer 24n of a user station and for realising the demultiplexer 24Bn of a base station.

The transmit channels can be subject to fading which alters the received signals. This fading can occur in the frequency and/or time-division domain. Therefore, it is desirable to perform an automatic gain control at the receiver end.

Figure 8:
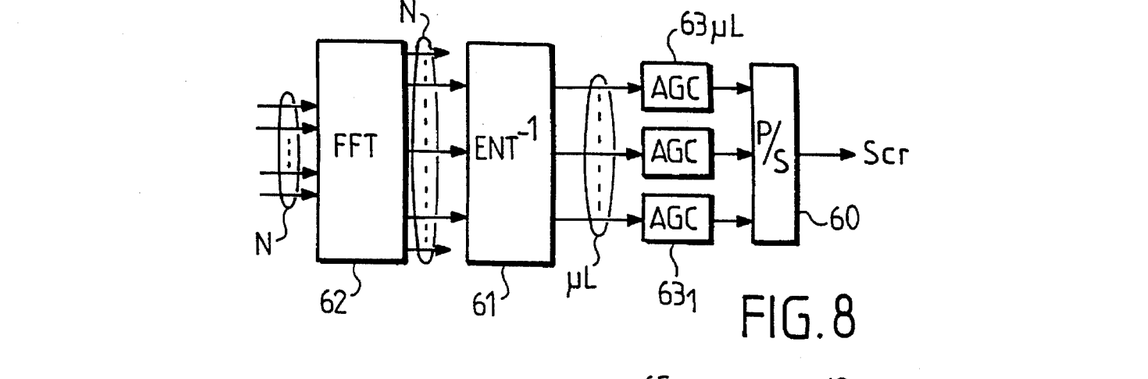
FIG. 8: a circuit diagram of a demultiplexer of a user station comprising automatic gain control.

FIG. 8 shows a partial circuit diagram of the receiving section of a user station with automatic gain control AGC. It corresponds to the diagram of FIG. 7 in which each of the μL signals assigned to each carder and coming from the de-interleaver 61 is produced by an AGC device $63_1$-$63_{\mu L}$. When there is no de-interleaver 61, the AGC devices are arranged at the output of the block FFT 62.

In a user station it is also possible to perform an aggregate automatic gain control by inserting an AGC device between the correlator 34 and the decision element 36 of FIG. 3-B.

Figure 9:
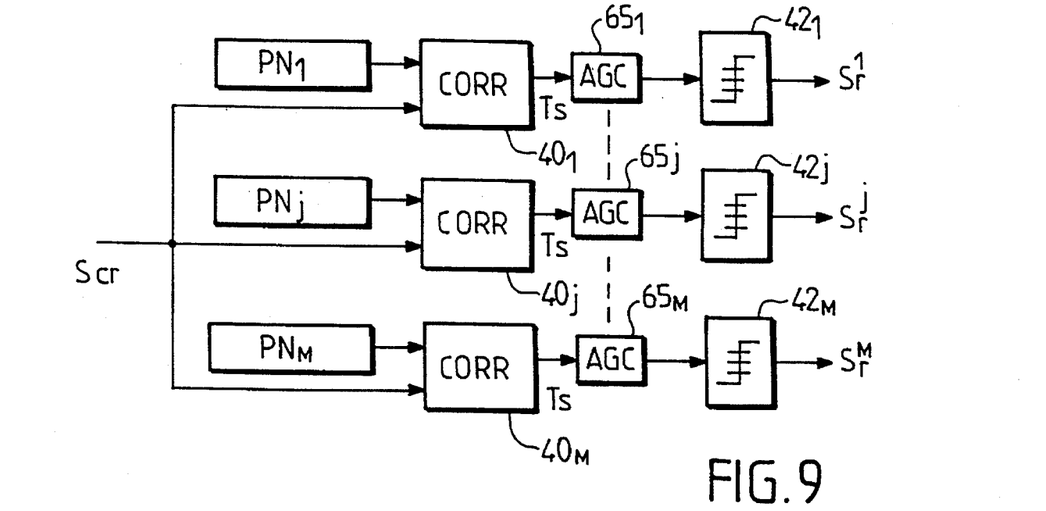
FIG. 9: a circuit diagram of a decoder of a base station comprising automatic gain control.

FIG. 9 shows a partial circuit diagram of the receiving section of a base station with automatic gain control AGC. This circuit diagram corresponds to the circuit diagram shown in FIG. 4. In this case the better performance is obtained by inserting an AGC device $65_1$-$65_M$ for each user at the output of each correlator $40_1$-$40_M$ so as to individually correct the imperfections caused by each channel.

The combination of the spread spectrum coding with a multicarrier modulation by orthogonal frequency-division multiplexing presents various advantages.

It is no longer necessary to perform a synchronization with the beginning of each sequence at the receiver end as required by the SSC technique when used alone.

Due to the use of a multicarrier modulation, there is a much wider choice of the pseudo-random sequences. In effect, it is permitted to have differences with respect to intercorrelation at any non-zero instants, of the sequences PN used, which is not the case if the SSC technique is used alone.

The OFDM signals are organized in frames. Since each user station has its own frame, the synchronization mechanisms at the receiver end are simplified. Moreover, the use of a check interval per data block makes it possible to do away with all the uncertainties that could appear no less caused by variable propagation delays which depend on the distances between transmitter and receiver than caused by delays owing to multiple paths. Particularly the propagation delays are linked with the coverage area of the base station. It is noted that the existence of the check interval makes it possible to increase this coverage area compared with the conventional SSC techniques and this without adding to the complexity of the software used. In the case of the conventional SSC technique one would of necessity need a complex equalizer to surmount these difficulties.

Moreover, according to the invention, the energy is distributed more uniformly over the channel, which renders the system more resistant to fading. The energy of the secondary lobes is much weaker for a multicarrier system than for a monocamer system.

We claim:

1. A multi-user communication system including at least one base transceiver station and a plurality of user transceiver stations for communicating a message via a plurality of carriers via said base transceiver station, said system comprising:

a first transforming circuit for transforming said message into symbols of a constellation;

a coding circuit coupled to said first transforming circuit for coding said symbols with a code by spread spectrum coding;

a transmitting circuit for transmitting said coded symbols by modulating by orthogonal frequency-division multiplexing;

a receiving circuit for receiving said coded symbols by demodulating by orthogonal frequency-division demultiplexing;

a decoding circuit for decoding said demodulated coded symbols; and a second transforming circuit for transforming said symbols into said message.

2. The system as claimed in claim 1, wherein said modulating circuit includes a serial-to-parallel device, a fourier transform circuit for applying an inverse fourier transform to said symbols, means for adding protection against echo symbols, a parallel-to-serial device and a circuit coupled to said parallel-to-serial device for adding additional symbols.

3. The system as claimed in claim 2, wherein said modulating circuit includes a time-division/frequency-division symbol interleaving circuit transform coupled between said serial-to-parallel circuit and said fourier transform circuit.

4. The system as claimed in claim 2, wherein said demodulating circuit includes a sampling circuit, a serial-to-parallel device coupled to said sampling circuit and a fourier transform device to generated the coded symbols.

5. A base transceiver station for transmitting a message to a plurality of user transceiver stations via a plurality of carriers, said base transceiver station comprising:

a first transforming circuit for transforming said message into symbols of a constellation;

a coding circuit coupled to said first transforming circuit for coding said symbols with a code by spread spectrum coding; and a transmitting circuit for transmitting said coded symbols by modulating by orthogonal frequency-division multiplexing.

6. The system as claimed in claim 5, wherein said demodulating circuit includes a sampling circuit, a serial-to-parallel device coupled to said sampling circuit and a fourier transform circuit to generate the coded symbols.

7. The system as claimed in claim 6, wherein said demodulating means includes a time-division/frequency-division symbol de-interleaving circuit coupled to said fourier transform circuit.

8. The system of claim 7, wherein said demodulating circuit includes an automatic gain control circuit.

9. The system of claim 7, wherein said demodulating circuit includes a plurality of automatic gain control circuits, one of said automatic gain control circuits corresponding to each carrier.

10. The system as claimed in claim 5, wherein said decoding circuit includes automatic gain control circuit, one of said automatic gain control circuits corresponding to each carrier.

11. A base transceiver station for receiving messages transmitted by a plurality of user transceiver stations as coded symbols via a plurality of carriers, said base transceiver station comprising:

a receiving circuit for receiving said coded symbols by demodulating by orthogonal frequency-division demultiplexing;

a decoding circuit for decoding said demodulated coded symbols; and a second transforming circuit for transforming said symbols into said message.

* * * * *